Sept. 27, 1938.    C. T. ELLIS    2,131,316
NONVIBRATING TUBE COUPLING
Filed Sept. 28, 1937
Fig. 1.
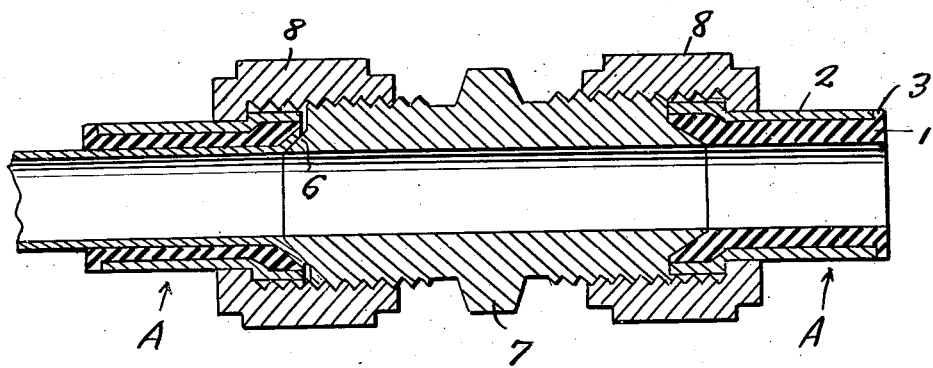
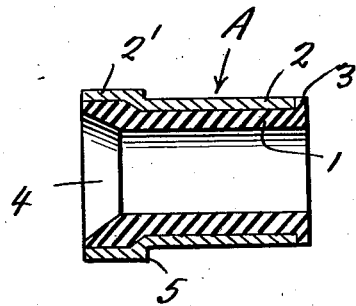
Fig. 2.
Inventor
Calvin Tyre Ellis
By Clarence A. O'Brien
Hyman Berman
Attorneys Patented Sept. 27, 1938

2,131,316

UNITED STATES PATENT OFFICE 2,131,316

NONVIBRATING TUBE COUPLING

Calvin Tyre Ellis, Philadelphia, Pa.

Application September 28, 1937, Serial No. 166,175

1 Claim. (Cl. 285—90)

This invention relates to a coupling or fitting for a pipe or tube line, the general object of the invention being to provide a fitting which will prevent the parts of the line being damaged by vibrations while insuring a fluid tight connection between the parts.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a longitudinal sectional view showing the invention in use with a double unit.

Figure 2 is a longitudinal sectional view through one of the couplings or fittings.

As shown in this drawing the improved fitting or coupling consists of a sleeve A composed of an inner tubular part 1 of plastic composition material and the metal tubular part 2 which surrounds the part 1 but at one end of the part 1 is an outward flange 3 against which one end of the member 2 abuts as shown. The inner member 1 has its other end enlarged and flaring internally as shown at 4, the exterior part of the enlargement fitting in an enlarged end 2' of the member 2, this enlargement forming a shoulder 5 at the inner end of the enlargement.

Thus when the device is used with a coupling, as shown in Figure 1 the flared part 4 of the inner member 1 will engage the flaring end of the tube which engages the tapered end 6 of the body member 7 of the coupling or union and the flange of the nut 8 of the union will engage the shoulder 5 and thus the device will be connected to the body member 7 of the coupling or union and the flange of the nut 8 of the union will engage the shoulder 5 and thus the device will be connected to the body member of the union in a fluid tight manner and the composition member receiving the part of the pipe or tube extending into the union will have a fluid tight fit thereon and this compositon member engaging the end of said tube and parts of the union 7 will absorb vibrations and prevent such vibrations from damaging the line by causing crystallization at parts of the line.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention what is claimed as new is:—

A fitting for preventing vibration in a pipe or tube line comprising an elongated sleeve-like member including a metal part and a composition inner part, said composition inner part having an exterior flange at one end abutting the adjacent end of the metal part and the other end of said inner part being exteriorly enlarged and said end being internally flared to fit the outwardly flared end of a tube on which the member is placed, the metal part having one end enlarged to receive the enlarged end of the inner part and said enlarged end of the metal part forming a shoulder at its inner end for engagement by a member which connects the tube with another member.

CALVIN TYRE ELLIS.